(12) United States Patent
Lee et al.

(10) Patent No.: US 7,031,741 B2
(45) Date of Patent: Apr. 18, 2006

(54) METHOD OF ADJUSTING A SIGNAL POWER IN A VARIABLE DATA RATE MODE IN A MOBILE COMMUNICATION SYSTEM

(75) Inventors: Young Jo Lee, Kunpo-shi (KR); Young Woo Yun, Seoul (KR); Ki Jun Kim, Seoul (KR); Soon Yil Kwon, Kunpo-shi (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 10/231,140

(22) Filed: Aug. 30, 2002

(65) Prior Publication Data

US 2003/0050086 A1   Mar. 13, 2003

(30) Foreign Application Priority Data

Sep. 7, 2001   (KR)   .............................. P2001-55091

(51) Int. Cl.
 *H04Q 7/20*   (2006.01)
(52) U.S. Cl. ..................... 455/522; 455/69; 455/127.1; 370/326
(58) Field of Classification Search ................ 455/522, 455/69, 226.2, 127.1, 343.1, 67.11; 370/445, 370/468, 479, 311, 320, 342, 326, 252
See application file for complete search history.

(56) References Cited

U.S. PATENT DOCUMENTS

| | | | | |
|---|---|---|---|---|
| 6,088,335 A | * | 7/2000 | I et al. | 370/252 |
| 6,782,271 B1 | * | 8/2004 | Huh et al. | 455/522 |
| 6,820,231 B1 | * | 11/2004 | Lee et al. | 714/781 |
| 6,898,192 B1 | * | 5/2005 | Chheda et al. | 370/311 |
| 2002/0172217 A1 | * | 11/2002 | Kadaba et al. | 370/443 |
| 2003/0064743 A1 | * | 4/2003 | Chen | 455/522 |

* cited by examiner

*Primary Examiner*—Tilahun Gesesse
(74) *Attorney, Agent, or Firm*—Fleshner & Kim, LLP

(57) ABSTRACT

The present invention relates to a mobile communication system, and more particularly, to a method of adjusting a signal power in a variable data rate mode. Accordingly, the present invention includes steps of allocating a reference pilot signal level to each of a plurality of data rates supported by the system and adjusting the reference pilot signal level for a changed data rate based on an external control information and adjusting a power control threshold for secondly adjusting the reference pilot signal level corresponding to the reference pilot signal level.

35 Claims, 5 Drawing Sheets

METHOD OF ADJUSTING A SIGNAL POWER IN A VARIABLE DATA RATE MODE IN A MOBILE COMMUNICATION SYSTEM

This application claims the benefit of the Korean Application No. P2001-55091, filed on Sep. 07, 2001, and published on Jan. 15, 2003, which is hereby incorporated by reference.

BACKGROUND OF THE INVENTION

1. Field of the Invention

The present invention relates to a mobile communication system, and more particularly, to a method of adjusting a signal power in a variable data rate mode in a mobile communication system.

2. Discussion of the Related Art

Generally, in a $3^{rd}$ generation mobile communication system of a CDMA type, a mobile station has a multi-channel structure that simultaneously transmits several traffic channels in order to provide diverse multimedia services such as voice, image, and data in addition to transmitting only one traffic channel as in the IS-95A.

Also, in a reverse link, a base station performs a coherent demodulation in order to improve the performance. The mobile station transmits a pilot channel along with a plurality of traffic channels so that the base station performs the coherent demodulation of the traffic channels.

A traffic-to-pilot power ratio is determined in accordance with a coding rate, a desired signal-to-interference ratio (SIR), a transmission rate, etc.

FIG. 1 is a block diagram explaining a conventional process of generating a multi-channel transmission signal.

As shown in FIG. 1, a mobile station passes a pilot channel and traffic channels (i.e., a dedicated control channel, a supplemental channel, and a fundamental channel) through a spreading unit 110 and a baseband filter 106 to transmit the channels to a base station.

At this time, gains of the respective traffic channels are adjusted through a relative gain section 102 before being spread so that the traffic channels are transmitted with relative transmission power ratios $G_F$, $G_C$, and $G_S$ of the traffic channels to the pilot channel.

Here, $G_F$ represents a value of the relative transmission power ratio of the fundamental channel for transmitting information such as voice and so on, $G_C$ represents a value of the relative transmission power ratio of the dedicated control channel used to transmit dedicated control information, and $G_S$ represents a value of the relative transmission power ratio of the supplemental channel used to transmit data.

The transmission power of the pilot channel is adjusted by a closed-loop power control through a reverse link.

The transmission power control of the traffic channels is performed in a manner that the transmission power ratio of the traffic channel to the pilot channel is maintained constantly.

The closed-loop power control is classified into two following types.

First, an inner-loop power control type measures the signal-to-interference ratio (SIR) of a received signal from a signal power of the pilot channel to compare the SIR with a power control threshold value, and transmits power control bits through a forward link.

Second, an outer-loop power control type periodically adjusts the power control threshold value in order to maintain a frame error rate (FER) desired by a radio channel that changes according to time.

At this time, the threshold value of power control to be used in a receiving end for each data rate is differently defined. In other words, the power level of a reference pilot signal to be used in a sending end for each data rate is differently defined.

Also, the power ratio of the traffic signal to the pilot signal is differently defined for the respective data rate.

Meanwhile, there have been proposed a 1x cdma2000 system designed to support a voice service of a circuit switched mode and an intermediate-speed and high-speed data service, a high data rate (HDR) or 1x-evolution data only (1x-EV DO) system proposed only for a high-speed packet data communication, and a 1x-evolution data and voice (1x-EV DV) system that is an integrated version of the two systems as described above. The data rate control in the above systems is performed as follows. Hereinafter, these systems will be generically named a 1x system.

There is a variable data rate mode among operation modes of the conventional 1x system.

Especially, in the variable data rate mode in the reverse link, a set of data rates fixed to one another should be defined between the mobile station and the base station in a negotiation stage.

Generally, in defining the data rate set, about 3 data rates are determined as a hypothesis set for the variable data rate, and the mobile station automatically changes the data rates within the set.

Specifically, if the mobile station judges the remaining power is not sufficient to maintain the present data rate as it is checking the remaining power that can be used by itself, it changes its own data rate to a lower data rate existing in the hypothesis set.

Then, the base station recognizes the changed data rate through a blind rate detection.

At this time, in order to control the signal power corresponding to the changed data rate, the 1x system uses the following methods.

As described above, the power ratio of the traffic signal to the pilot signal should be changed for the respective data rates. That is, in case of a high data rate, the level of the received pilot signal should also be heightened. As described above, if the power level of the received pilot signal is separately controlled for the respective data rate, the variable data rate operation becomes impossible. That is, since the data rate of the reverse link currently transmitted cannot be known until the base station completely receives one frame, it is impossible to determine the power control threshold value to be used in the inner loop.

In order to solve the above-described problem, there has been proposed a method of using the reference pilot power level for the maximum data rate allocated in the hypothesis set with respect to other data rates in the hypothesis set. That is, in case of using the power level of the reference pilot signal to the maximum data rate in other data rates in the hypothesis set, i.e., in case that the mobile station transmits the corresponding signal with a data rate different from the maximum data rate, the power ratio value of the supplemental channel signal to the pilot signal becomes different from the original power ratio value.

An example of this process will now be explained.

It is assumed that the hypothesis set to be used is put as {9.6 kbps, 19.2 kbps, 38.4 kbps} through the negotiation stage between the mobile station and the base station. In this case, the optimum power ratios of the pilot signal to the traffic signal are determined as follows for the respective data rates.

(Pilot:Traffic)=(1:2.37), 9.6 kbps (Pilot:Traffic)=(1.02:4.3), 19.2 kbps (Pilot:Traffic)=(1.37:7.7), 38.4 kbps At this time, the power ratios of the traffic signal to the pilot signal for each data rate used in the variable data rate will be (1.37:2.37), (1.37:4.3), and (1.37:7.7) with respect to 9.6 kbps, 19.2 kbps, and 38.4 kbps, respectively.

Next, the variable data rate used in the 1x-EV DO system is driven in the following manner.

First, the mobile station has a set of 5 transmission data rates {9.6 kbps, 19.2 kbps, 38.4 kbps, 76.8 kbps, 153.6 kbps}.

The mobile station starts the transmission with the minimum data rate of 9.6 kbps. Then, for each frame transmission time point, the mobile station performs a p-persistent test, and increases the data rate by one stage only in case of passing this test.

At this time, the probability value that the mobile station increases the data rate in the set of the above-described data rates gets smaller as the data rate becomes higher.

Then, the base station measures the power level of an interference signal, and if the power level of the interference signal becomes higher than a certain threshold value during the measurement, it generates a common reverse activity (RA) bit to transmit the common RA bit to the mobile stations.

The mobile stations that received the RA bit perform the p-persistent test, and only the mobile stations determined to lower the rate during the test lower the data rate by one stage.

The mobile station should accurately transfer the data rate selected during the above process to the base station through a reverse rate indicator (RRI) channel.

In the variable rate operation process as described above, the power level of the reference pilot signal to the lowest data rate in the set of 5 data rates is also used in other data rates in the set, and the base station sets the power control threshold value to the pilot signal to be used in the inner-loop power control on the basis of the reference pilot power level.

The above-described methods, however, have the following problems if they are used in the variable data rate operation process considered in the 1x-EV DV system.

The set of variable data rates currently considered is {9.6 kbps, 19.2 kbps, 38.4 kbps, 76.8 kbps, 153.6 kbps, 307.2 kbps, 614.4 kbps, 1024 kbps} that has 8 data rates.

In this case, if the power level of the reference pilot signal to the maximum data rate of 1024 kbps is used for all the data rates that can be supported in the system, the power of the pilot signal becomes excessively large in comparison to the power of the data to be sent.

As a result, it brings the excessive increase of overhead.

Even if the power level of the reference pilot signal of 153.6 kbps that is an intermediate data rate is used, the power of the pilot signal cannot provide the power sufficient for demodulation of 8PSK that is used in 1024 kbps. Also, the use of the power level of the reference pilot signal of 9.6 kbps that is the minimum data rate cannot provide the reference pilot signal level sufficient for the operation of 1024 kbps or 614.4 kbps.

SUMMARY OF THE INVENTION

Accordingly, the present invention is directed to a method of controlling a power of a pilot signal in a variable data rate mode that substantially obviates one or more problems due to limitations and disadvantages of the related art.

An object of the present invention is to provide a method of adjusting a signal power suitable to determine a power control threshold value in a variable data rate mode.

Another object of the present invention is to provide a method of adjusting a signal power that does not increase an overhead of a pilot signal in a variable data rate mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of adjusting a signal power in a variable data rate mode in a mobile communication system, comprises steps of allocating a reference pilot signal level to each of a plurality of data rates supported by the system, adjusting the reference pilot signal level for a changed data rate based on an external control information and adjusting a power control threshold for secondly adjusting the reference pilot signal level corresponding to the reference pilot signal level.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
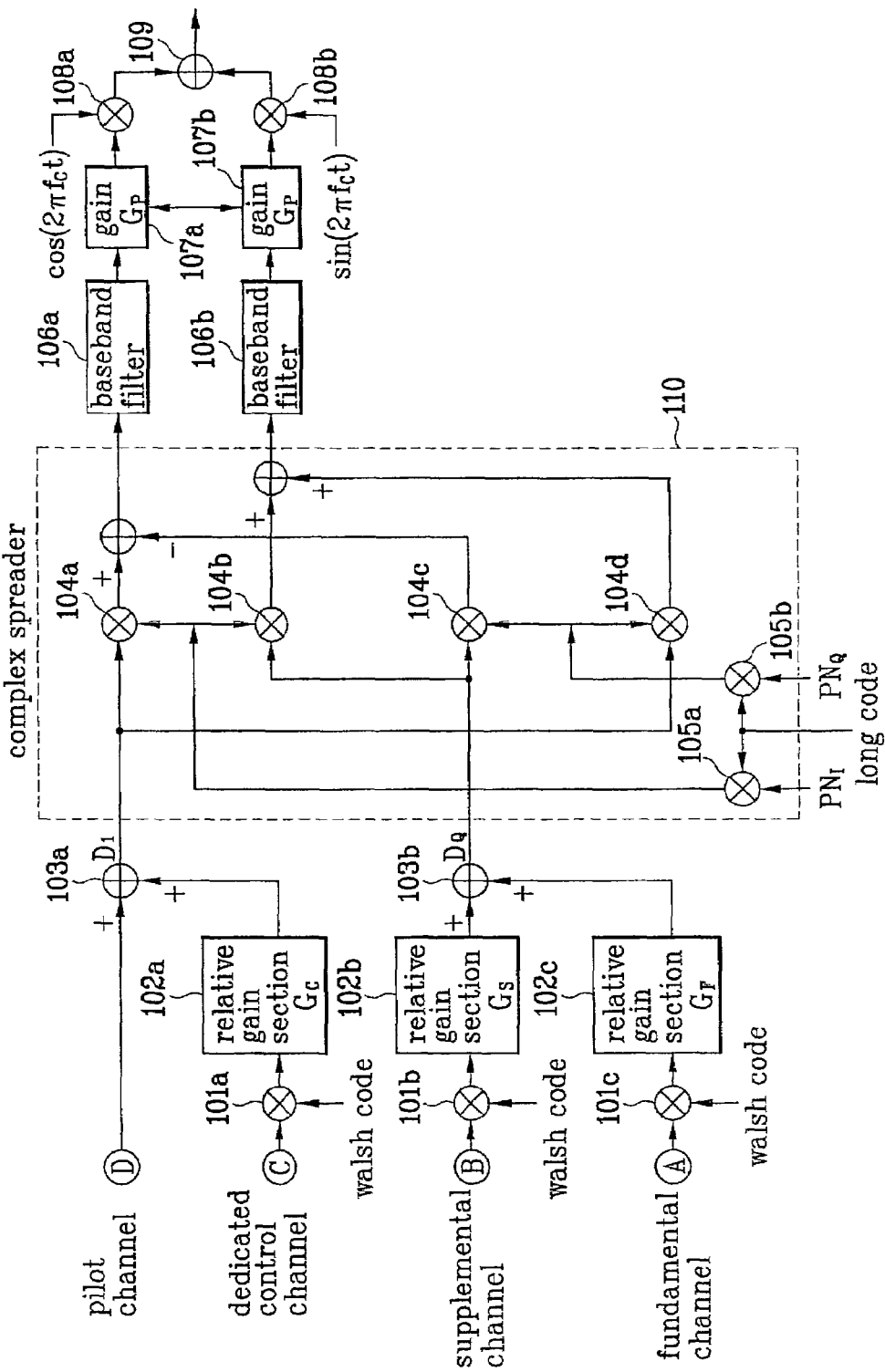
FIG. 1 is a block diagram explaining a conventional process of generating a multi-channel transmission signal.

Reference will now be made in detail to the preferred embodiments of the present invention, examples of which are illustrated in the accompanying drawings. Wherever possible, the same reference numbers will be used throughout the drawings to refer to the same or like parts.

The present invention proposes a method of changing a power level of a reference pilot signal, a power ratio of a pilot signal to a traffic signal according to the power level of the reference pilot signal, and a power control threshold value to the pilot signal of an inner power control loop to be used in a base station in case that a variable data rate is performed through a dedicated type rate control with respect to a channel for transmitting packet data in a reverse link of a 1x-EV DV system.

First, data rates considered in the reverse link are 8, i.e., {9.6 kbps, 19.2 kbps, 38.4 kbps, 76.8 kbps, 153.6 kbps, 307.2 kbps, 614.4 kbps, 1024 kbps}.

For convenience' sake, the channel for transmitting the packet data in the reverse link will be called a reverse packet data channel (R-PDCH). Also, it is assumed that a sending end in the reverse link is a mobile station, and a receiving end is a base station.

If the mobile station has data to be sent, it starts transmission of packets with the minimum data rate of 9.6 kbps even without permission of the base station. Here, the mobile station cannot start the packet transmission to the base station with any other data rates except for the minimum data rate.

The base station estimates reverse quality information between the mobile station and the base station, and generates a dedicated reverse rate control (RRC) bit.

The base station transmits the dedicated RRC bit to the corresponding mobile station, and controls the mobile station to heighten or lower the data rate of the R-PDCH or to maintain the original data rate.

The mobile station, after receiving the dedicated RRC bit, adjusts the data rate of the R-PDCH corresponding to the control bit, and transmits the adjusted data rate to the base station through a reverse rate indicator (RRI) channel of the reverse link. This is for the base station to accurately know the changed data rate of the mobile station.

In the variable data rate transmission mode, it is necessary for the mobile station to change the reference pilot power level for the transmission power control of other signals (i.e., traffic signals for transmitting the voice, image, and dedicated control information). As described above, this is because the mobile station operating in the variable data rate mode cannot use one fixed reference pilot power level like the existing 1x system since the number of data rates in the hypothesis set is 8.

Also, the process of changing the reference pilot power level and the power control threshold value for the base station's generation of the reverse power control information according to the pilot power level should be performed accurately at a consistent time point between the base station and the mobile station. If the time point is not consistent between the base station and the mobile station, malfunction of the power control may be produced.

Accordingly, it is necessary to change the reference pilot power level during the operation process of the variable data rate, and the reference pilot power level is adjusted through three different methods as follows.

First is a method of changing the pilot power level using an upper-signaling message.

In this method, the 8 data rates are classified into three groups. The three resultant groups are expressed as follows.
Group A: {9.6 kbps, 19.2 kbps, 38.4 kbps, 76.8 kbps}
Group B: {38.4 kbps, 76.8 kbps, 153.6 kbps, 307.2 kbps}
Group C: {153.6 kbps, 307.2 kbps, 614.4 kbps, 1024 kbps}

The respective groups have reference pilot power levels to be used in their own groups. These reference pilot power levels are values selected so that the operations of all the data rates in the respective groups become optimum.

Based on the reference pilot power level determined as above, the power ratios of the pilot signal to the traffic signal are determined for the data rates in the respective groups.

Using the groups defined as above, the data rate control and the power control in the variable data rate mode between the mobile station and the base station are performed.

Figure 2:
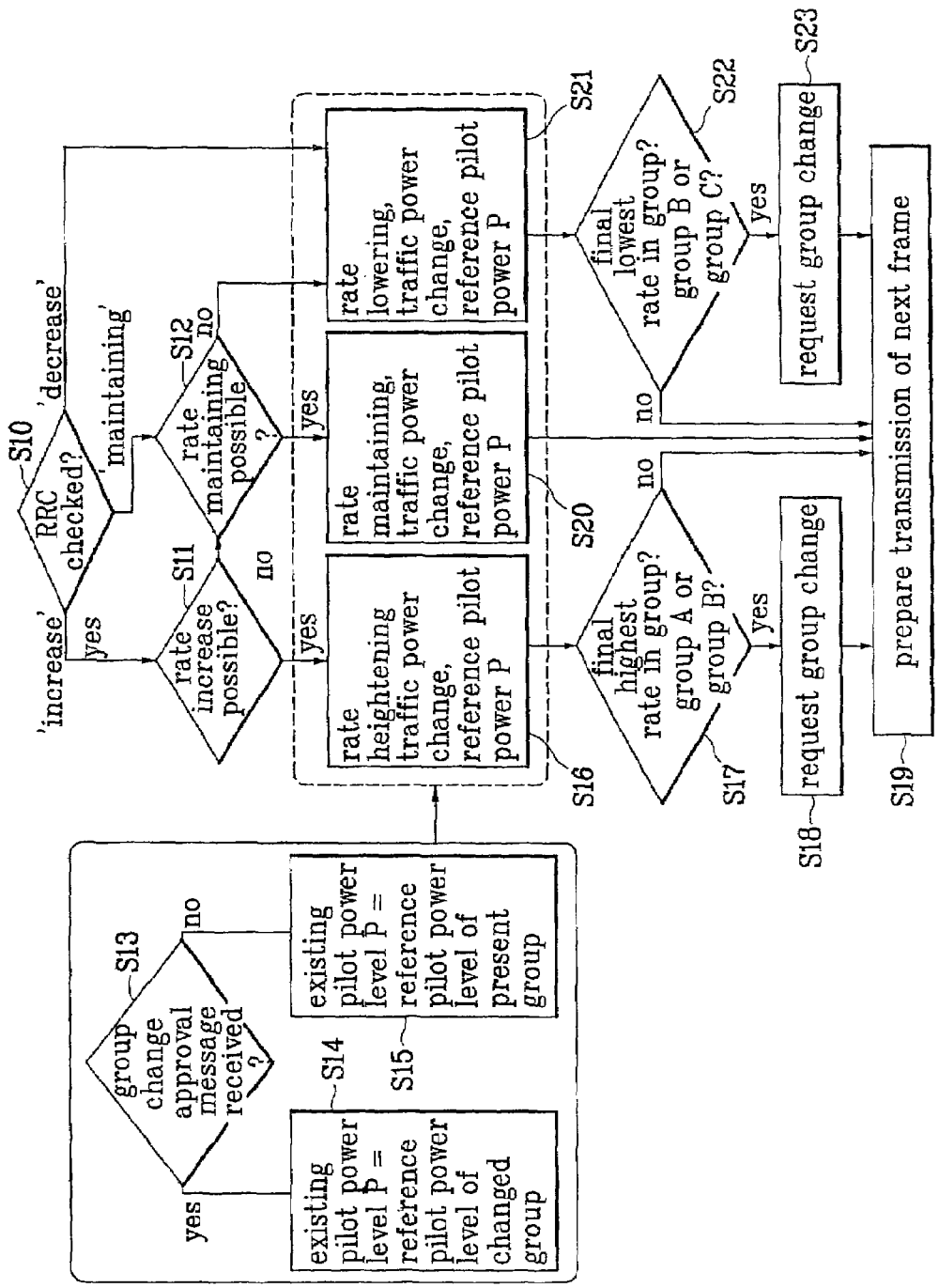
FIG. 2 is a view illustrating a data rate changing procedure in a variable data rate mode according to the present invention.

FIG. 2 is a view illustrating the data rate changing procedure in the variable data rate mode according to the present invention.

In case that the mobile station has the packet data to be sent, it always starts transmission of the R-PDCH using the minimum data rate of 9.6 kbps.

Thus, the mobile station starts the data transmission in the group A. Here, the reference pilot signal power that is used by the mobile station becomes the reference pilot signal power of the group A $P_{REF,A}$.

The mobile station receives the dedicated RRC bit from the base station and checks the dedicated RRC bit (step S10).

The mobile station, according to a command indicated by the RRC bit (step S11 or S12), maintains or heightens the present data rate (step S16 or S20).

In case of heightening the present data rate, the mobile station changes the traffic signal power, but does not change the reference pilot power level. However, in case of maintaining the present data rate, the mobile station does not change the traffic signal power and the reference pilot power level.

Thereafter, the mobile station judges whether the data rate of the signal transmitted by the mobile station is the maximum data rate in the group to which the mobile station itself belongs (step S17). For instance, if the data rate is 76.8 kbps in the group A, the mobile station transmits a request message for changing the group to the base station in order to change its belonging group to the group B (step S18).

The base station transmits an approval message to the mobile station in response to the change request message.

The mobile station that received the approval message changes the group to which it belongs to the group B. Then, the mobile station uses the reference pilot signal power $P_{REF,B}$ defined in the group B and the power ratio of the pilot signal to the traffic signal for the respective data rate (steps S13 and S14).

During this process, the mobile station can first change the present data rate to the data rate outside the group to which the mobile station itself belongs before it receives the approval message from the base station in response to the group change request message sent by itself.

However, the mobile station that could not receive the approval message maintains the reference pilot power level of the present group (step S15). Accordingly, the mobile station uses the value of the reference pilot power level defined in its belonging group, transmits the present frame by determining the traffic power level corresponding to the changed or maintained data rate, and then prepares the transmission of the next frame (step S20).

In the same manner, if the transmission data rate becomes 307.2 kbps while the mobile station in the group B continues the signal transmission to the base station, the mobile station changes its belonging group to the group C through the same process as described above, and uses the reference pilot power level $P_{REF,C}$ of the group C.

The above-described process is also applied to the process of lowering the data rate in the same manner.

The mobile station, according to the command indicated by the RRC bit (step S12), lowers the present data rate (step S21). In case of decreasing the present data rate, the mobile station changes the traffic signal power, but does not change the reference pilot power level.

Thereafter, the mobile station judges whether the data rate of the signal transmitted by the mobile station is the minimum data rate in the group to which the mobile station itself belongs (step S22). For instance, if the data rate is 153.6 kbps in the group C, the mobile station transmits a request message for changing the group to the base station in order to change its belonging group to the group B (step S23).

The base station transmits an approval message to the mobile station in response to the change request message.

The mobile station that received the approval message changes the group to which it belongs to the group B. Then, the mobile station uses the reference pilot signal power $P_{REF,B}$ defined in the group B and the power ratio of the pilot signal to the traffic signal for the respective data rate (steps S13 and S14).

During this process, the mobile station can first change the present data rate to the data rate outside the group to which the mobile station itself belongs before it receives the approval message from the base station in response to the group change request message sent by itself.

However, the mobile station that could not receive the approval message maintains the reference pilot power level of the present group (step S15). Accordingly, the mobile station uses the value of the reference pilot power level defined in its belonging group, transmits the present frame by determining the traffic power level corresponding to the changed or maintained data rate, and then prepares the transmission of the next frame (step S20).

In the same manner, if the transmission data rate becomes 38.4 kbps while the mobile station in the group B continues the signal transmission to the base station, the mobile station changes its belonging group to the group A through the same process as described above, and uses the reference pilot power level $P_{REF,A}$ of the group A.

Specifically, the change of the group is effected according to the following rule.

The base station, after sending to the corresponding mobile station the approval message in response to the group change request of the mobile station, changes the power control threshold value (i.e., a value for generating a reverse power control bit to be transmitted to the mobile station) to be used in the base station after a predetermined delay time (corresponding to the predetermined number of frames) in accordance with the reference pilot power level to be transmitted from the mobile station.

(1) (Group A→Group B), (Group B→Group C): a rule of the group change in case of heightening the data rate (2) (Group B→Group A), (Group C→Group B): a rule of the group change in case of lowering the data rate The reason why the group B is used during the above process is to put a buffer zone for lowering the frequent generation of the message according to the change of the data rate.

Second is a method whereby the mobile station changes a reference pilot power level in a variable data rate mode using a direct command of a physical layer, instead of using a message of an upper layer. This method will now be explained with reference to FIG. 3.

In this method, the time point when the reference pilot power level is changed between the base station and the mobile station is engaged as follows.

First, in case that the base station generates a dedicated RRC bit for the data rate control of the mobile station, the following is assumed.

After generating the RRC bit that once changes the data rate, the base station does not change the data rate change command for the time of (n−1) frames. As a result, the data rate change rate is considered to be actually (50/n) Hz.

The mobile station, after receiving the RRC bit, determines its own transmission data rate, and transmits the data rate to the base station through the reverse rate indicator (RRI) channel.

The base station can judge what operation the mobile station is performing with respect to the RRC bit transmitted by the base station itself just after it receives the RRI channel.

After continuing the confirmation of the RRI for the time of n frames, the base station changes the threshold value to be used in the power control using the reference pilot power level corresponding to the data rate that is considered to be sent by the mobile station.

The mobile station transmits the signal to the base station with the same data rate continuously for the time of n frames, matches only the power of the traffic signal to the transmission data rate, and maintains the previous value of the reference pilot signal.

Just after the time of n frames elapses, the mobile station changes the reference pilot signal level.

Through the above process, the mobile station and the base station can change the value of the reference pilot signal level and the threshold value to be used in the power control at an accurate time point.

At this time, the information of the RRI channel additionally includes an index bit for informing the order of the present RRI channel.

Figure 3:
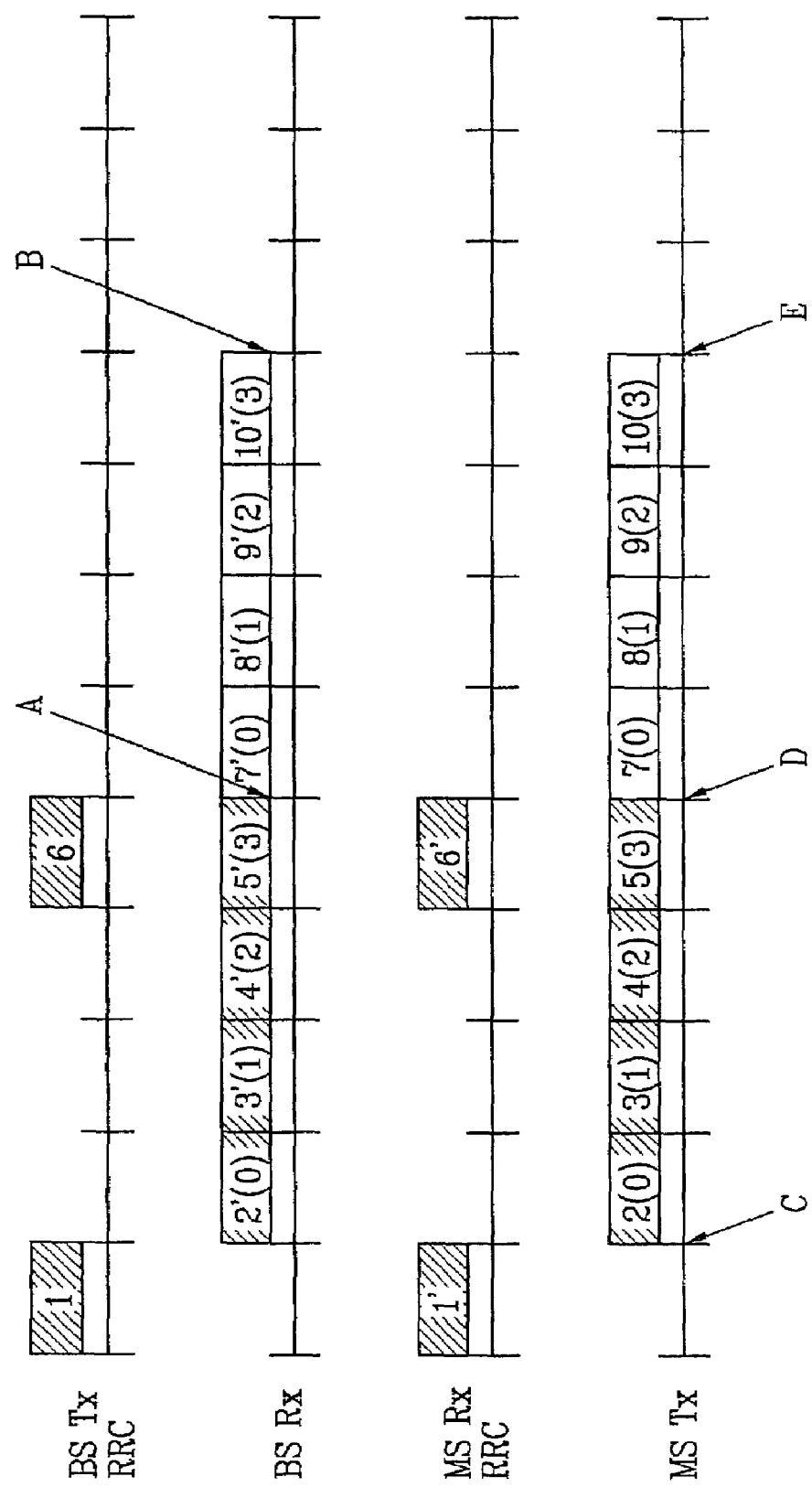
FIG. 3 is a timing chart for a data rate control between a base station and a mobile station according to the present invention.

FIG. 3 is a timing chart for the data rate control between the base station and the mobile station according to the present invention.

Here, it is assumed that the number N of frames is 4. The time delay for the transmission of the frames between the base station and the mobile station is not considered. MS Rx and BS Rx represent receiving parts of the mobile station and the base station, and MS Tx and BS Tx represent sending parts of the mobile station and the base station.

Referring to FIG. 3, at a time point 1, the base station generates the RRC control bit, and transmits the generated RRC control bit to the mobile station.

At the time point 1', the mobile station receives the RRC bit, determines the data rate to be sent to the next frame, and starts transmission of the frame having the determined data rate to the base station at a time point 2 (in FIG. 3, it is also called C).

At this time, the power of the traffic signal in the mobile station should be determined according to the adjusted data rate, and the power level of the reference pilot signal is maintained to the previous value. Also, the data rate transmitted at the time point 2 should be also maintained at frame time points 3, 4, and 5. That is, the data rate transmitted at the time point is maintained for 4 frames.

From the time point 2 to the time point 5, the mobile station continuously informs the present data rate to the base station through the RRI channel, and in order to inform the order of the RRI channel being now transmitted, the RRI channel includes the time indexes of (0,1,2,3). In FIG. 3, the numerals in parentheses of BS Rx and MS Tx indicate time index values. In order to include and transmit the time index, th RRI channel requires additional information of 2 bits.

After the time for 4 frames elapses, the reference pilot power level value to be used in a transmission time point 7 (in FIG. 3, it is also called D) is changed based on the data rate previously used.

The base station receives the RRI channels at time points 2', 3', 4', and 5'. Even when only one among the 4 RRI channels is properly received, the base station changes the power control threshold value to be applied at a time point 7' (in FIG. 3, it is also called A) using the data rate indicated by the received RRI channel.

The above process is continuously repeated (at time points 6, 7, 8, 9, and 10).

Through the above-described process, the time point of the change of the reference pilot power level to be used by the mobile station and the threshold value to be used during the power control procedure of the base station can be accurately checked.

Third is a method whereby the base station automatically changes a power control threshold value and the mobile station automatically changes a reference pilot power level.

In the third method, the mobile station changes the reference pilot power level using a specified algorithm for itself without any instructions received, and in the same manner, the base station detects the effective data rate transmitted from the mobile station through the RRI channel, and uses the power control threshold value corresponding to the effective data rate.

The third method is for solving the following special case.

If the base station uses a lower power control threshold value and the mobile station changes in advance the reference pilot power level to a higher level, the base station will compare the received pilot power level with the power control threshold value, and transmit a power-down command to the corresponding mobile station in succession.

In this case, the time point when the base station detects that the reference pilot power level of the mobile station is heightened will be the time point after the base station receives the RRI channel and decodes the data rate for the present frame.

However, due to the difference between the power control threshold value of the base station and the reference pilot power level of the mobile station, the base station frequently transmits the power-down command to the mobile station, and this causes the receiving power level of the RRI channel transmitted from the mobile station to become lower than the receiving power level where the base station can perform a proper decoding. As a result, the base station may not detect the data rate currently used by the mobile station, and thus the performance of the system may be greatly deteriorated.

Accordingly, the present invention heightens the reference pilot power level to be used by the mobile station after the base station heightens in advance the power control threshold value by setting a time delay of N frames at maximum in case that the mobile station heightens the reference pilot power level.

On the contrary, in case that the mobile station lowers in advance the reference pilot power level and the base station uses the high power control threshold value, big trouble is not produced.

In this case, the base station continuously generates the power-up command by comparing the received pilot power level with the power control threshold value, and after properly receiving the RRI channel transmitted from the mobile station, it can apply the changed power control threshold value. Based on such assumption, the following flowchart of FIG. 4 can be obtained.

Figure 4:
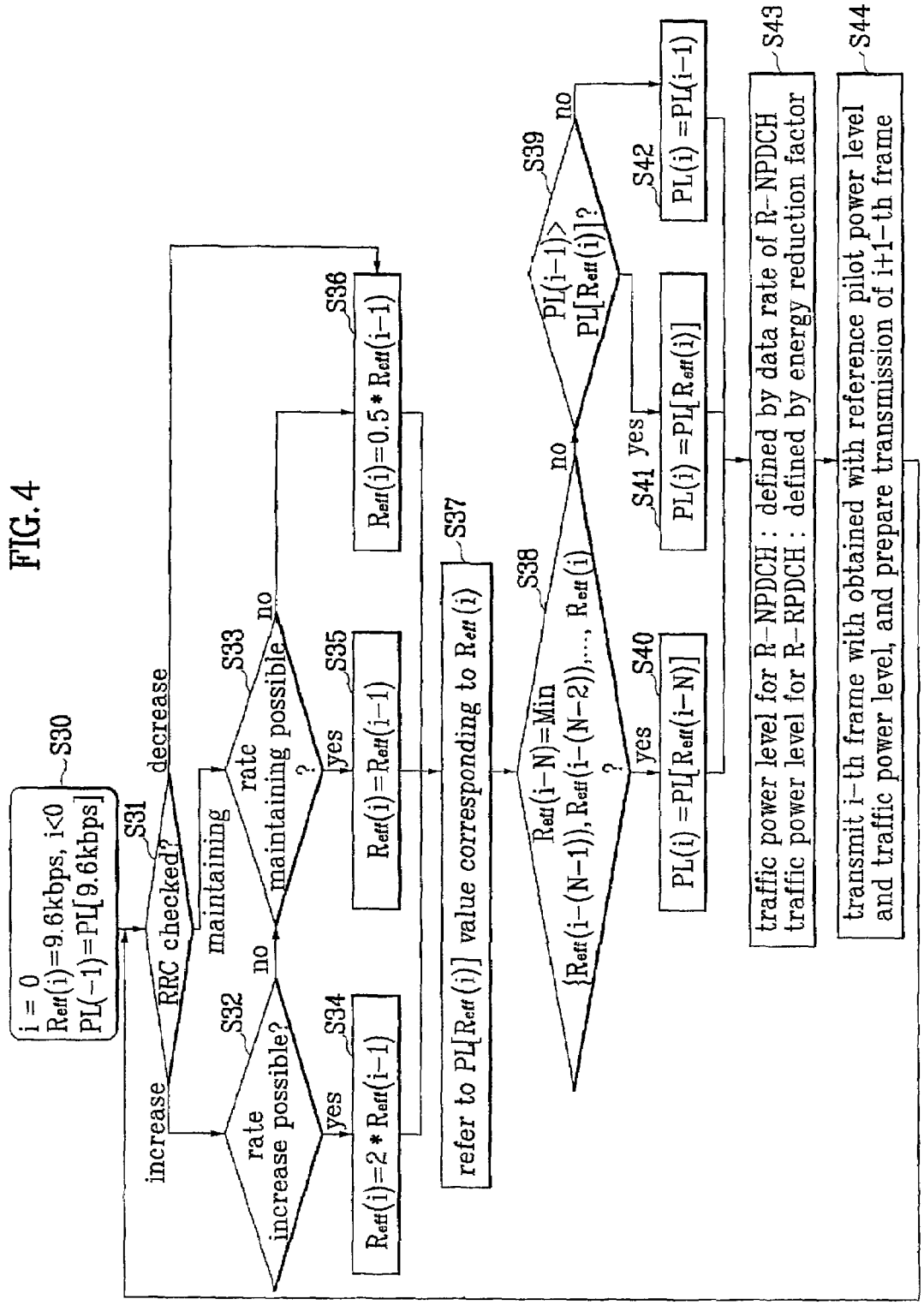
FIG. 4 is a flowchart illustrating a power control process of a mobile station according to the present invention.

FIG. 4 is a flowchart illustrating the power control process of the mobile station according to the present invention.

Among parameters used in FIG. 4, $R_{eff}(i)$ is an effective data rate adjusted by the reverse dedicated data rate control at an i-th frame time. It is to be noted that this effective data rate is a combined data rate of a reverse new packet data channel (R-NPDCH) and a reverse retransmission packet data channel (R-RPDCH) in case of considering a hybrid automatic repeat request (ARQ) request.

The present invention uses a method of re-transmitting the packet in which NACK is transmitted from the receiving end and multiplexing the transmission of a new packet. At this time, the multiplexing technique that is considered for multiplexing the re-transmitted packet and the new packet is classified into two methods, i.e., a code division multiplexing (CDM) and a time division multiplexing (TDM).

For this, the following channels are defined on the reverse link.

First, the channel for the reverse packet transmission is called a reverse packet data channel (R-PDCH). The R-PDCH is composed of two kinds of sub-channels, i.e., a reverse new packet data channel (R-NPDCH) used for transmission of a new packet and a reverse retransmission packet data channel (R-RPDCH) for transmission of a re-transmitted packet.

The two sub-channels as above are multiplexed using the CDM or TDM method.

First, in case of using the CDM method, the R-NPDCH and the R-RPDCH are transmitted on independent physical channels using different Walsh codes.

In case of using the TDM method, the retransmission and the new transmission are multiplexed in time on one physical channel using one Walsh code.

N represents the number of delayed frames with respect to the changed pilot power level, and has a fixed value.

PL(i) represents a pilot level (PL) changed at the i-th frame time.

$PL[R_{eff}(i)]$ represents a predefined pilot level with respect to the effective data rate $R_{eff}(i)$.

At this time, the data rate of the R-NPDCH itself may be the $R_{eff}(i)$ or "0".

At this time, the following process is required according to the present invention.

The mobile station should accurately indicate the current data rate to the base station through the RRI channel. At this time, it is assumed that the data rate indicated by the mobile station to the base station is the $R_{eff}(i)$. As described above, since the transmission data rate of the packet initially sent is 9.6 kbps, the $R_{eff}(i)$ is 9.6 kbps, and at this time, the reference pilot power level PL(−1) is equal to PL(9.6 kbps) set from 9.6 kbps (step S30).

The mobile station preferentially checks the RRC bit from the base station (step S31), and grasps what command the base station sent for the transmission data rate control (step S31).

According to a command for increasing or maintaining the data rate, the mobile station judges whether it can heighten or maintain the data rate in accordance with its status (step S32 or S33), and if it is judged possible, it calculates the effective data rate $R_{eff}(i)$ at the i-th frame time. In the present invention, it is exemplified that the calculated $R_{eff}(i)$ becomes twice greater than or is equal to the effective data rate at the previous frame time (step S34 or S35). According to a command for decreasing the data rate, the mobile station calculates the effective data rate $R_{eff}(i)$ at the i-th frame time. In the present invention, it is exemplified that the calculated $R_{eff}(i)$ becomes smaller than the effective data rate at the previous frame time by ½ (step S36). Then, the value of the reference pilot power level $PL[R_{eff}(i)]$ corresponding to the $R_{eff}(i)$ calculated as above is referred (step S37) Next, the mobile station checks whether the effective data rates for the predetermined N-frame delay time are always larger than or equal to the effective data rate at the (i–N)-th frame time (step S38).

If the effective data rates for the predetermined N-frame delay time are always larger than or equal to the effective data rate at the (i–N)-th frame time, the mobile station sets the reference pilot power level at the i-th frame time to the $PL[R_{eff}(i-N)]$ value (step S40). If not, the mobile station compares the reference pilot power level PL(i–1) used at the previous frame time with the reference pilot power level $PL[R_{eff}(i)]$ of the present effective data rate (step S39), and if the reference pilot power level PL(i–1) used at the previous frame time is greater than the reference pilot power level $PL[R_{eff}(i)]$, the mobile station instantly changes the reference pilot power level to be used in the present frame to the $PL[R_{eff}(i)]$ (step S41). That is, the mobile station increasingly adjusts the reference pilot signal level after a prescribed delay or decreasingly adjusts it without a delay in accordance with the changed data rate.

If the reference pilot power level used at the previous frame time is smaller than or equal to the reference pilot power level $PL[R_{eff}(i)]$, the reference pilot power level is not changed (step S42).

Thereafter, the traffic power level of the R-NPDCH is defined by the data rate, and the traffic level of the R-RPDCH is defined by an energy reduction factor (step S43).

Here, by using the energy reduction factor, the traffic to pilot power ratio of R-RPDCH is reduced by a constant amount from the traffic to pilot power ratio defined for the corresponding data rate on R-NPDCH so that the receiving power level of the retransmitted data on R-RPDCH is reduced for a constant rate from the initially transmitted data on R-NPDCH.

Thereafter, the mobile station transmits the i-th frame according to the obtained reference pilot power level and the traffic power level, and prepares transmission of the next frame (step S44).

In case that the mobile station changes the reference pilot power level as above, the base station preferentially searches for the effective data rate $R_{eff}(i)$ of the present frame by decoding the RRI channel, and changes the power control threshold value to be used in the base station to match the effective data rate.

Figure 5:
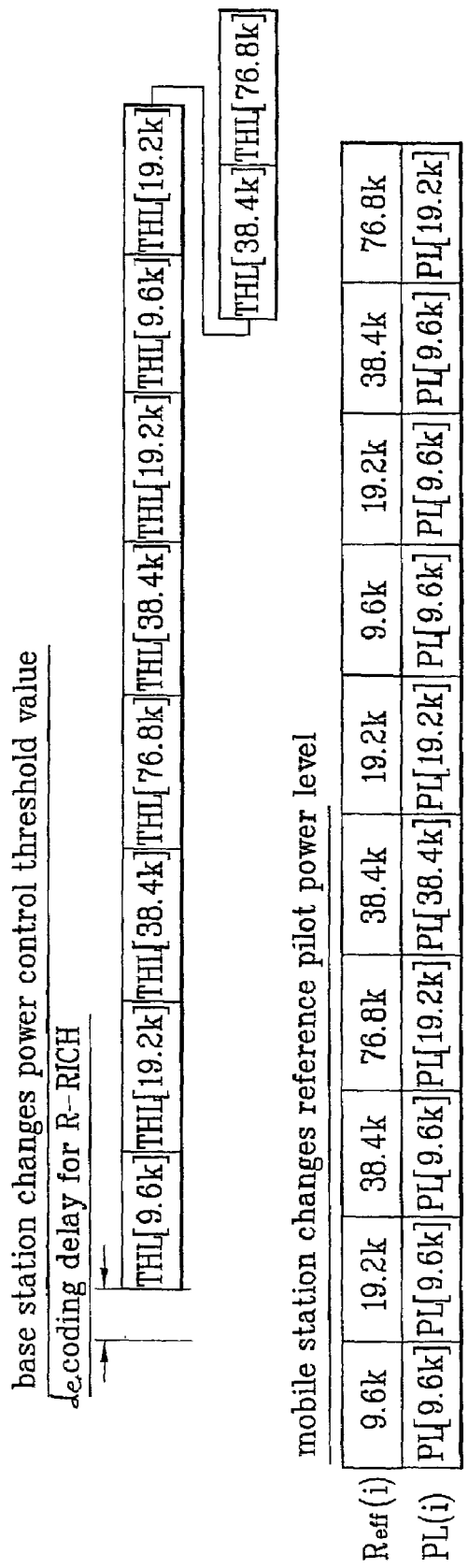
FIG. 5 is a view illustrating an example of a power control change in a base station and a pilot power level change in a mobile station according to the process of FIG. 4.

FIG. 5 is a view illustrating an example of the power control change in the base station and the pilot power level change in the mobile station according to the process of FIG. 4.

FIG. 5 shows an example of the change of the pilot power level of the mobile station according to the process of FIG. 4 if it is assumed that N=2.

As shown in FIG. 5, the mobile station changes the reference pilot power level to be used by the mobile station itself according to the flowchart of FIG. 4, and the base station receives the RRI channel, and changes the power control threshold value to the $R_{eff}(i)$ indicated by the RRI channel.

If this method is used, the case that the power control threshold value used in the base station is set to be lower than the reference pilot power level used in the mobile station does not proceed. Also, the reference pilot power level for any data rate in variable data rate operation is guaranteed to be the reference pilot power level defined for the data rate which is lower than the present data rate by at most N stage. In other words, the reference pilot power level for the present data rate is guaranteed to be at least the reference pilot power level defined for the data rate that is lower than the present data rate by N stage. Generally, if N is 2, it is possible according to the present invention that the mobile station uses at least the reference pilot power level for the data rate that is lower than the present data rate by at most 2 stage, and this enables the operation of the variable data rate without great loss of the performance. For example, if the effective data rate currently transmitted is 76.8 kbps and N is 2, the minimum reference pilot power level for this data rate in variable rate operation is guaranteed to be the reference pilot power level corresponding to 19.2 kbps that is lower than the present data rate by 2 stages in transmission of 76.8 kbps.

Also, as described above, it can be prevented that the base station uses the power control threshold value that is lower than the reference pilot power level used by the mobile station, and thus propagation of the erroneous power control can be prevented.

In summary, if the mobile station has any packet to be sent by the mobile station itself, it starts transmission of the packet always with the lowest data rate of 9.6 kbps without permission of the base station.

Thereafter, the base station generates the dedicated RRC bit using the quality information of the reverse channel and so on, and the mobile station starts the adjustment of the transmission data rate through the RRC bit.

In the above-described adjustment process, the mobile station and the base station changes the pilot power level to be used according to a predetermined engagement and the threshold value to be used during the power control process. At this time, as described above, one among the method using the upper signaling message, the method using the indicator channel of a physical layer, and the method of changing the reference pilot power level and the power control threshold value by the mobile station and the base station, respectively.

As described above, according to the present invention, a communication system that provides a satisfactory performance with respect to all possible reverse data rates supported in the variable data rate mode can be constructed.

Especially, the present invention can construct a communication system that provides a satisfactory performance with respect to all possible reverse data rates supported in the variable data rate mode by using a method of changing the reference pilot power level to be used by the mobile station and the power control threshold value to be used by the base station according to the data rate in the variable data rate mode for reverse transmission of packet data.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of adjusting a signal power in a variable data rate mode of a mobile communication system, comprising:
    allocating a reference pilot signal level to each of a plurality of data rates supported by the system;
    determining a data rate based on an external control information;
    transmitting a data rate information corresponding to the determined data rate;

adjusting a power control threshold that is compared with the reference pilot signal level to generate a value of a power control bit for controlling the reference pilot signal level; and adjusting the reference pilot power signal level based on the determined data rate.

2. The method of claim 1, wherein the external control information is dedicated rate control information for a reverse link.

3. The method of claim 1, wherein the data rates supported by the system are classified into a predetermined number of groups, and the power of the pilot signal is designated for each of the groups.

4. The method of claim 1, wherein the power control threshold is adjusted in accordance with the reference pilot signal level of a group to which the changed data rate belongs.

5. The method of claim 4, wherein one group includes at least two data rates duplicative of the other.

6. The method of claim 1, wherein the reference pilot signal level and the power control threshold are simultaneously adjusted.

7. The method of claim 6, wherein the data rate information is transmitted through a reverse link rate indicator channel.

8. The method of claim 7, wherein the reverse link rate indicator channel further includes a time index of a frame through which information of the changed data rate is transmitted to simultaneously adjust the reference pilot signal level and the power control threshold.

9. The method of claim 1, wherein the power control threshold is adjusted based on the reference pilot signal level corresponding to the determined data rate.

10. The method of claim 1, wherein the reference pilot signal level is increasingly adjusted after a prescribed delay or decreasingly adjusted without a delay in accordance with the changed data rate.

11. The method of claim 1, wherein the power control threshold is adjusted in accordance with the reference pilot signal level corresponding to the determined data rate.

12. A method of adjusting a signal power in a variable data rate mode in a mobile communication system, comprising:
classifying data rates supported by the communication system into a predetermined number of groups;
allocating a reference pilot signal level to each of the data rates;
reporting a change of the data rate group to a different group if a changed data rate based on an external control information is the highest or lowest data rate among the data rates which a group includes;
adjusting a power control threshold for adjusting the reference pilot signal level after transmitting a change-approval message in response to the reporting; and
adjusting the power of the pilot signal corresponding to the changed group after receiving the approval message.

13. The method of claim 12, wherein the external control information is dedicated rate control information for a reverse link.

14. The method of claim 12, wherein the power control threshold is used for generating a power control bit for commanding to control the reference pilot signal level.

15. The method of claim 12, wherein one group includes at least two data rates duplicative of the other.

16. The method of claim 12, further comprising:
maintaining a prescribed reference pilot signal level allocated for the group;
changing a prescribed traffic signal level defined for each data rate;
wherein the changed data rate is not the highest or lowest data rate among the data rates which a group includes.

17. A method of adjusting a signal power in a variable data rate mode in a mobile communication system, comprising:
determining a data rate based on an external control information;
continuously transmitting information of the determined data rate for a predetermined time;
adjusting a power control threshold for adjusting a reference pilot signal level by monitoring the transmitted information for the predetermined time; and
adjusting the reference pilot signal level for transferring data in accordance with a changed data rate after the predetermined time.

18. The method of claim 17, wherein the changed data rate is transmitted on a reverse link rate indicator channel.

19. The method of claim 18, wherein the power control threshold is adjusted in accordance with the reference pilot signal level corresponding to the changed data rate.

20. The method of claim 18, wherein the reverse link rate indicator channel further includes a time index of a frame through which information of the changed data rate is transmitted.

21. The method of claim 17, wherein the determined data rate is maintained for the prescribed time with reference pilot signal level maintained to the previous value and traffic signal power level is changed to the level defined for the determined data rate.

22. The method of claim 17, wherein the power control threshold is maintained for the prescribed time, and the change of power control threshold is performed after the prescribed time when correctly decoding the present data rate indicated on the reverse rate indication channel at least once during the prescribed time period.

23. The method of claim 17, wherein the external control information is dedicated rate control information for a reverse link.

24. The method of claim 17, wherein the power control threshold is used for generating a power control bit for commanding to control the reference pilot signal level.

25. A method of adjusting a signal power in a variable data rate mode in a mobile communication system, comprising:
determining an effective data rate changed from a present i-th frame based on an external control information;
comparing the determined data rate with each data rate of previous N frames; and
adjusting a reference pilot signal level for transferring data according to a result of comparison; and
adjusting a power control threshold that is compared with the reference pilot signal corresponding to the changed data rate to determine a value of a power control bit.

26. The method of claim 25, wherein if the effective data rates for a delay time of the N frames are larger than or equal to the effective data rate at an (i-N)-th frame time, the reference pilot signal level of the present frame is set as the reference pilot signal level before the N frames.

27. The method of claim 25, further comprising
comparing the reference pilot signal level defined against the effective data rate at the present frame with the reference pilot signal level used in a previous i-1-th frame if at least one data rate among the previous N frames is smaller than the effective data rate at an (i-N)-th frame time; and
adjusting the reference pilot signal level in accordance with the result of the comparison.

28. The method of claim 27, wherein the determined data rate is a combined data rate of a channel for transmitting a new packet and a channel for transmitting a packet whose retransmission is requested.

29. The method of claim 27, wherein one transmits information of the changed effective data rate to the other through a reverse link rate indicator channel.

30. The method of claim 29, wherein the power control threshold is adjusted in accordance with the reference pilot signal level corresponding to the changed data rate.

31. The method of claim 25, wherein the external control information is dedicated rate control information for a reverse link.

32. The method of claim 25, wherein the power control threshold is used for generating a power control bit for commanding to control the reference pilot signal level of the mobile station.

33. A method of adjusting a signal power in a variable data rate mode in a mobile communication system, comprising:
   allocating a reference pilot signal level for transferring data to each of a plurality of data rates supported by the system;
   determining a transmission data rate according to the data rate control information;
   transmitting a rate indication information based on the determined data rate;
   changing a power control threshold level to generate a power control bit based on the rate indication information; and
   changing the reference pilot signal power level according to the determined transmission data rate.

34. A method for supporting a variable rate mode in a communication system, comprising:
   receiving a rate control command;
   determining a data rate based on the rate control command;
   transmitting a data using a traffic channel power based on the determined data rate while a reference pilot power is maintaining;
   transmitting a rate indication information based on the determined data rate; and
   adjusting the reference pilot power after a predetermined time.

35. The method of claim 34, wherein the rate indication information is transmitted on a rate indication channel.

* * * * *